US012695564B2

(12) United States Patent     (10) Patent No.:   US 12,695,564 B2

Ji et al.       (45) Date of Patent:     Jul. 28, 2026

(54) METHOD FOR DETERMINING FORMAT OF CONTROL SIGNALING, INDICATION METHOD, AND DEVICE

(71) Applicant: VIVO MOBILE COMMUNICATION CO., LTD., Dongguan (CN)

(72) Inventors: Zichao Ji, Dongguan (CN); Siqi Liu, Dongguan (CN); Gen Li, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 559 days.

(21) Appl. No.: 17/970,210

(22) Filed: Oct. 20, 2022

(65) Prior Publication Data

US 2023/0042801 A1     Feb. 9, 2023

Related U.S. Application Data

(63) Continuation of application No. PCT/CN2021/087717, filed on Apr. 16, 2021.

(30) Foreign Application Priority Data

Apr. 22, 2020    (CN) .......................... 202010323610.0

(51) Int. Cl.
    *H04L 5/00*       (2006.01)
    *H04W 28/06*     (2009.01)

(52) U.S. Cl.
    CPC .......... *H04L 5/0048* (2013.01); *H04W 28/06* (2013.01)

(58) Field of Classification Search
    CPC ............................ H04L 5/0048; H04W 28/06
    See application file for complete search history.

(56) References Cited

U.S. PATENT DOCUMENTS

| | | | |
|---|---|---|---|
| 2016/0309542 A1 | 10/2016 | Kowalski et al. | |
| 2018/0254874 A1* | 9/2018 | Wang .................... | H04L 5/0091 |
| 2019/0149380 A1 | 5/2019 | Babaei et al. | |
| 2019/0246378 A1* | 8/2019 | Islam .................... | H04L 1/1819 |
| 2019/0274032 A1 | 9/2019 | Chatterjee et al. | |
| 2022/0053553 A1* | 2/2022 | Li .......................... | H04W 72/23 |

FOREIGN PATENT DOCUMENTS

| | | |
|---|---|---|
| CN | 101345984 A | 1/2009 |
| CN | 102137504 A | 7/2011 |
| CN | 102237961 A | 11/2011 |
| CN | 102404085 A | 4/2012 |
| CN | 103312398 A | 9/2013 |
| CN | 106559201 A | 4/2017 |

(Continued)

OTHER PUBLICATIONS

Huawei, Hisilicon, "Discussion on Direct Indication Information," 3GPP TSG-RAN WG2 Meeting #97, R2-1701875, Feb. 13-17, 2017. See CN First OA.

(Continued)

*Primary Examiner* — Elton Williams

(57) ABSTRACT

This application discloses a method for determining a format of control signaling, an indication method, and a device, and relates to the field of communication technologies. The method includes: obtaining indication information of control signaling, where the indication information is used for indicating a format of the control signaling.

18 Claims, 4 Drawing Sheets

(56) References Cited

FOREIGN PATENT DOCUMENTS

| CN | 108702281 | A | 10/2018 |
|----|-----------|---|---------|
| CN | 109802755 | A | 5/2019 |
| CN | 110034894 | A | 7/2019 |
| CN | 110719633 | A | 1/2020 |
| CN | 111010889 | A | 4/2020 |
| EP | 3528406 | A1 | 8/2019 |
| JP | 2011-239396 | A | 11/2011 |
| JP | 2017-204860 | A | 11/2017 |
| JP | 2019-533360 | A | 11/2019 |
| JP | 2020-515108 | A | 5/2020 |
| JP | 2020-523860 | A | 8/2020 |
| JP | 2020-526945 | A | 8/2020 |
| JP | 2021-502032 | A | 1/2021 |
| JP | 2021-530913 | A | 11/2021 |
| JP | 2022-502946 | A | 1/2022 |
| KR | 10-2009-0033126 | A | 4/2009 |
| KR | 10-2019-0139309 | A | 12/2019 |
| WO | 2018/028680 | A1 | 2/2018 |
| WO | 2018/091037 | A1 | 5/2018 |
| WO | 2018/126665 | A1 | 7/2018 |
| WO | 2019/019938 | A1 | 1/2019 |
| WO | 2019/079500 | A1 | 4/2019 |
| WO | 2019/089033 | A1 | 5/2019 |
| WO | 2019/194711 | A1 | 10/2019 |
| WO | 2019/215704 | A1 | 11/2019 |
| WO | 2020/011078 | A1 | 1/2020 |
| WO | 2020/065624 | A1 | 4/2020 |

OTHER PUBLICATIONS

RAN WG1/RAN WG2, LS on direct indication in DCI format 1C,: 3GPP TSG RAN WG2#97, R2-1700772, Feb. 13-17, 2017 and 3GPP TSG RAN WG1#87, R1-1613816, Nov. 14-18, 2016. See CN First OA.

China National Intellectual Property Administration (ISA/CN), International Search Report in corresponding application PCT/CN2021/087717, mailed Jun. 25, 2021.

The State Intellectual Property Office of the People's Republic of China, First Office Action in corresponding application No. 202010323610.0, dated Mar. 21, 2022.

3GPP TSG RAN WG1 Meeting #AH_NR2. R1-1710081. CATT. "Contents of the group-common PDCCH." Qingdao, P.R. China, Jun. 27-30, 2017.

China National Intellectual Property Office, Supplementary Search Report issued in corresponding Application No. CN 2020103236100 dated Jul. 25, 2023. (Translation not available.).

Japan Patent Office, Grant Decision issued in corresponding Application No. JP 2022-564273, dispatched Dec. 12, 2023. (Translation not available.).

Japan Patent Office, Office Action issued in corresponding Application No. 2022-564273, dispatched Aug. 22, 2023. (Translation not available.).

European Patent Office, Extended European Search Report issued in corresponding Application No. EP 21791778, mailed Sep. 15, 2023.

Korean Intellectual Property Office, Office Action issued in corresponding Application No. 10-2022-7040838, dated Nov. 10, 2023. (Translation not available.).

Intellectual Property India, Examination Report issued in corresponding Application No. 202217066678 mailed Dec. 29, 2023.

* cited by examiner

METHOD FOR DETERMINING FORMAT OF CONTROL SIGNALING, INDICATION METHOD, AND DEVICE

CROSS-REFERENCE TO RELATED APPLICATIONS

This application is a continuation of International Application No. PCT/CN2021/087717, filed on Apr. 16, 2021, which claims the priority of Chinese Patent Application No. 202010323610.0 filed in China on Apr. 22, 2020, the entire contents of which are hereby incorporated by references.

TECHNICAL FIELD

This application belongs to the field of mobile communication technologies, and in particular, to a method for determining a format of control signaling, an indication method, and a device.

BACKGROUND

In a new radio (NR) system of the 5th-Generation (5G) mobile communication technology, control signaling is designed with more flexible and diverse formats according to requirements during use. For example, a first version supports four formats of downlink control signaling (DCI): 0_0, 0_1, 1_0, and 1_1, which are respectively used for uplink and downlink scheduling; and new DCI formats 0_2 and 1_2 are then introduced to support more flexible sizes of the DCI, and there may be more formats in the future.

However, in a process of implementing this application, the inventor found that there are at least the following problems in the related art: a quantity of formats of control signaling exceeds a limit of a quantity of pieces of control signaling with different sizes supported by a user-side device (UE), so that the hardware cost and the complexity of blind detection of the UE are improved. When control signaling with different formats has a same size, the UE cannot distinguish different control signaling, resulting in a communication failure.

SUMMARY

According to a first aspect of this application, a method for determining a format of control signaling is provided, which includes:

obtaining indication information of control signaling, where the indication information is used for indicating a format of the control signaling.

According to a second aspect of this application, a method for indicating a format of control signaling is provided, which includes:

sending control signaling, where the control signaling includes indication information, and the indication information is used for indicating a format of the control signaling.

According to a third aspect of this application, an apparatus for determining a format of control signaling is provided, which includes:

an obtaining module, configured to obtain indication information of control signaling, where the indication information is used for indicating a format of the control signaling.

According to a fourth aspect of this application, an apparatus for indicating a format of control signaling is provided, which includes:

a first sending module, configured to send a control signaling, where the control signaling includes indication information, and the indication information is used for indicating a format of the control signaling.

According to a fifth aspect of this application, an electronic device is provided. The electronic device includes a processor, a memory, and a program or instruction stored in the memory and executable on the processor, the program or instruction, when executed by the processor, implementing the steps of the method according to the first aspect, or implementing the steps of the method according to the second aspect.

According to a sixth aspect of this application, a readable storage medium is provided. The readable storage medium stores a program or instruction, the program or instruction, when executed by a processor, implementing the steps of the method according to the first aspect, or implementing the steps of the method according to the second aspect.

According to a seventh aspect of this application, a chip is provided, which includes: a processor and a communication interface, where the communication interface is coupled to the processor, and the processor is configured to run a program or instruction, to implement the method according to the first aspect.

DETAILED DESCRIPTION

The following clearly describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It should be understood that the terms in such a way are interchangeable in proper circumstances, so that the embodiments of this application can be implemented in other orders than the order illustrated or described herein. In addition, in the specification and the claims, "and/or" means at least one of the connected objects, and the character "/" generally indicates an "or" relationship between the associated objects.

A method for determining a format of control signaling provided in the embodiments of this application is described below through specific embodiments and application scenarios thereof with reference to the accompanying drawings.

The method for determining a format of control signaling in the embodiments of this application is applied to a user-side device UE, which may be an access terminal, a user unit, a subscriber unit, a user station, a mobile station, a mobile console, a remote station, a remote terminal, a mobile device, a user terminal, a terminal, a wireless communication device, a user agent, or a user apparatus. The terminal device may also be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, or a wearable device.

Figure 1:
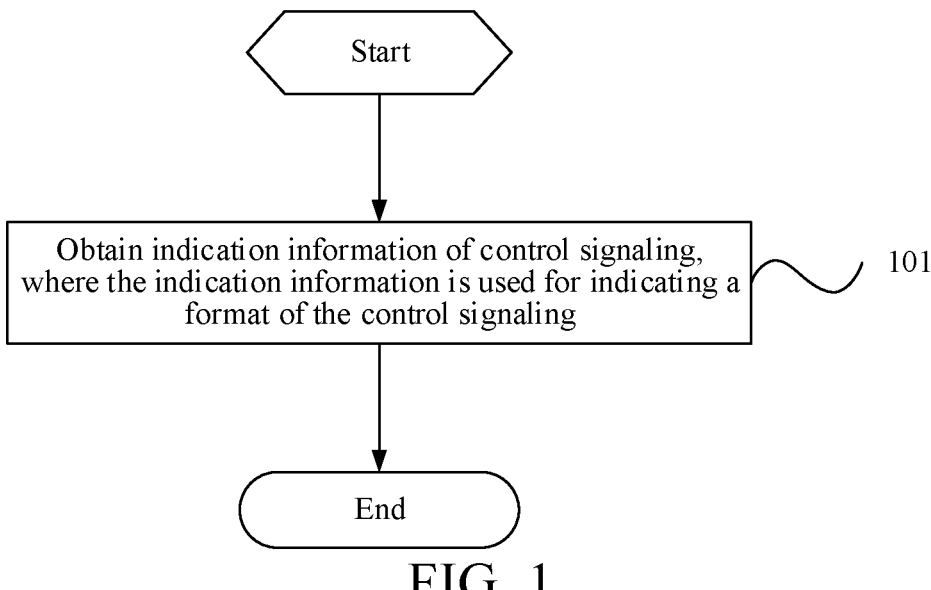
FIG. 1 is a schematic flowchart of a method for determining a format of control signaling according to an embodiment of this application.

As shown in FIG. 1, a method for determining a format of control signaling in this embodiment of this application includes:

Step 101. Obtain indication information of control signaling, where the indication information is used for indicating a format of the control signaling.

According to this step, a user-side device can directly know, by obtaining indication information of control signaling, a format of the control signaling from the indication information, so that a limit of a size of control signaling blindly detected by the user-side device can be maintained while a plurality of formats of control signaling are flexibly supported, thereby reducing the implementation complexity of the user-side device, and saving power consumption and costs of the user device.

The control signaling may be DCI, or may be radio resource control signaling (Radio Resource Control, RRC), or may be media access control control element signaling (Media Access Control Control Element, MAC CE), or the like. The DCI is used as an example for specific description in the following embodiments.

A UE to which the method for determining a format of control signaling in this embodiment of this application is applied can know, by obtaining indication information of the DCI, a specific format of the DCI from the indication information, such as DCI 1-1, rather than be limited to knowing that the DCI is used for uplink scheduling or downlink scheduling. Moreover, the indication information can distinguish different common DCI, and can also distinguish the common DCI and UE-specific DCI.

In this embodiment, optionally, the indication information is information in a first information domain of the control signaling, where the first information domain is dedicatedly used for indicating the format of the control signaling.

In this way, for the indication information used for indicating the format of the control signaling, a dedicated domain, namely, the first information domain, may be introduced in the control signaling. Certainly, the first information domain always exists when the UE monitors all bandwidth parts BWP, all search spaces, and all monitoring occasions of the control signaling.

For example, a first information domain T is introduced in the DCI, and is used for indicating a specific format of the DCI. Alternatively, the domain T may indicate one format of the DCI used for downlink scheduling, that is, the UE knows through the domain T that the DCI is DCI 1_0, DCI 1_2, or DCI 1_x.

Optionally, the first information domain is located at a preset location in the control signaling, and the preset location is:

a start location; or an end location; or a location before or after a target domain.

In this way, the first information domain may be located at the start location in the control signaling, that is, the first information domain is a first domain of the control signaling. Alternatively, the first information domain may be located at the end location in the control signaling, that is, the first information domain is a last domain of the control signaling, but the domain is located before a cyclic redundancy check (CRC). Alternatively, the first information domain may be located at the location before or after the target domain in the control signaling. For example, for the DCI, if the target domain is a 1-bit domain of identifiers for DCI formats (Identifier for DCI formats) used for distinguishing uplink and downlink formats, the location of T may be a location after the domain of Identifiers for DCI formats. If the target domain is a carrier indicator (Carrier indicator) domain, an uplink or supplementary uplink indicator (UL/SUL indicator) domain, a bandwidth part indicator (Bandwidth part indicator) domain, a deep flow inspection flag (DFI flag) domain, a frequency domain resource assignment (Frequency domain resource assignment) domain, or the like, the location of T may be a location before the target domain.

In this embodiment, according to one aspect, optionally, before step 101, the method further includes:

receiving configuration information sent by a network-side device, where the configuration information is used for indicating whether the indication information exists in the control signaling.

In this way, the UE can know, according to the received configuration information, whether the indication information exists in the control signaling, thereby obtaining the indication information. Certainly, the configuration information may also include information indicating a specific location of the indication information in the control signaling, a size of the indication information, content of the indication information, the format corresponding to the control signaling having the indication information, or the like.

The configuration information may be carried by the RRC, the MAC CE, or the DCI (such as group common (group common) DCI) sent by a network-side device.

According to another aspect, optionally, in a case that a preset condition is met, the control signaling carries the indication information.

Herein, for the preset condition, the control signaling carries the indication information in a case that the preset condition is met. Alternatively, for an implementation of carrying the indication information through the first information domain, whether the first information domain exists is determined according to whether the preset condition is met. For example, in a case that the preset condition is met, the DCI may introduce T to carry the indication information. However, in addition to that the first information domain is not introduced (for example, a size of the first information domain is 0 bits), that the control signaling does not carry the indication information may also be represented as that a value of the first information domain is set to a preset value (such as, 0).

In this embodiment, optionally, the preset condition includes at least one of the following:

control signaling corresponds to a preset bandwidth part BWP;

control signaling corresponds to a preset search space;

control signaling corresponds to a preset control resource set;

control signaling corresponds to a preset monitoring occasion;

control signaling is in a first preset format;

control signaling supports a preset function;

in monitored control signaling, a quantity of pieces of control signaling with different first sizes is greater than a preset value;

in a plurality of pieces of monitored control signaling, there are at least two pieces of control signaling with a same first size;

in a plurality of pieces of monitored control signaling, there are at least two pieces of control signaling with a same scrambling code;

in a plurality of pieces of monitored control signaling, there are at least two pieces of control signaling that use a same radio network temporary identifier RNTI to scramble a cyclic redundancy check CRC; or in a plurality of pieces of monitored control signaling, there are at least two pieces of control signaling whose control channel elements CCE overlap.

In this way, in a case that at least one of the above content is met, the control signaling carries the indication information indicating the format of the control signaling. The first preset format may be a specific format, and certainly, may also be one group of or a plurality of formats of a specific type. For example, a first preset format corresponding to the DCI may be only DCI 1_0, and may also be DCI formats used for downlink scheduling: the DCI 1_0, DCI 1_1, and DCI 1_2. The first size is a size of the control signaling determined based on a function or payload (payload) of the control signaling, and the control signaling with the first size is not considered whether to include the indication information indicating the format of the control signaling. The preset value may be a quantity of pieces of DCI with different sizes that is pre-defined by a system, configured by a network, or supported by the UE. For example, a preset value corresponding to the DCI may be a DCI size budget size budget of the UE, and the DCI size budget is a quantity of pieces of DCI with different sizes that are at most monitored by the UE for each cell. For example, if a first size of a monitored DCI format A is the same as a first size of a DCI format B, but monitoring occasions or CCEs do not overlap, the indication information is not carried.

Certainly, if the network-side device configures the control signaling to have the first information domain and meet the above preset condition, the first information domain includes the indication information. For example, if the network-side device configures the DCI to have T and meet the above preset condition, T includes the indication information indicating the DCI format.

Optionally, the control signaling is one or more pieces of control signaling meeting the preset condition.

In this way, in a case that the preset condition is met, the one or more pieces of control signaling carry the indication information. In a case that the preset condition is met, which pieces of control signaling that may carry the indication information may be determined by formats of the control signaling. For example, the preset condition is that there is at least two pieces of DCI with a same first size in a plurality of monitored pieces of DCI. In a case that the preset condition is met, the at least two pieces of DCI may all carry the indication information, or may partially carry the indication information. Alternatively, part of pieces of DCI carrying the indication information may be non-basic scheduling non-fallback DCI. It should be known that, basic scheduling fallback DCI includes DCI 1_0 and 0_0, which may be monitored in a common search space (Common search space, CSS). The non-fallback DCI refers to other UE-specific DCI formats other than the fallback DCI.

In addition, in this embodiment, optionally, the control signaling is control signaling in a second preset format.

In this way, the UE only can obtain the indication information of the control signaling in the second preset format. The second preset format may be a specific format, and certainly, may also be one group or a plurality of formats of a specific type. For example, a second preset format corresponding to the DCI may be only DCI 0_1, and may also be a non-fallback uplink scheduling format, namely, the DCI 0_1 and DCI 0_2.

Certainly, if the indication information is information in the first information domain of the control signaling, and corresponds to the second preset format, the first information domain is associated with the second preset format, that is, control signaling in a non-second preset format does not include the first information domain. For example, for the DCI, if the second preset format is the DCI 0_1, T is associated with the DCI 0_1, that is, the DCI 0_2 does not include T, so that the UE may distinguish different DCI formats according to DCI sizes.

In this embodiment, optionally, a size of the indication information is configured by a network-side device; or corresponds to a quantity of formats of the control signaling monitored by a user-side device; or corresponds to a quantity of formats of the control signaling including the indication information.

The network-side device may configure the size of the indication information through the configuration information, such as 0, 1, or 2 bits. If the size of the indication information corresponds to the quantity of formats of the control signaling monitored by the user-side device, the size of the indication information may be equal to the quantity of formats of the control signaling monitored by the user-side device, or may be calculated by using a preset related function based on the quantity of formats of the control signaling monitored by the user-side device. For example, the size of the indication information is S bits, $S=\lceil \log_2 N \rceil$, and N is the quantity of formats of the monitored control signaling. Similarly, if the size of the indication information corresponds to the quantity of formats of the control signaling including the indication information, the size of the indication information may be equal to the quantity of formats of the control signaling including the indication information, or may be calculated by using a preset related function based on the quantity of formats of the control signaling including the indication information. For example, the size of the indication information is S bits, $S=\lceil \log_2 M \rceil$, and M is the quantity of formats of the control signaling including the indication information.

By using the DCI as an example, if the second preset format is an uplink scheduling format, namely, DCI 0_0 and DCI 0_1, a quantity of formats of DCI including the indication information is 2, and the size of the indication information is 1 bit.

Certainly, if the indication information is the information in the first information domain of the control signaling, the size of the indication information is the size of the first information domain.

In this embodiment, optionally, the content of the indication information is predefined, or configured by the network-side device.

For the predefined content of the indication information, the UE obtains the indication information, and can directly know the format of the control signaling indicated by the indication information. For the content of the indication information configured by the network-side device, the UE needs to first know configuration for the content of the indication information through the configuration information of the network-side device, and then can know the format of the control signaling indicated by the indication information after obtaining the indication information.

In addition, in this embodiment, optionally, each code point corresponds to the format of the control signaling in the indication information; or a value of the indication information corresponds to the format of the control signaling.

In this way, by predefinition or configuration of the network-side device, one implementation is that each code point in the indication information corresponds to the format of the control signaling; and the other implementation is that the value of the indication information corresponds to the format of the control signaling.

For example, for the DCI, assuming that there are four DCI formats A, B, C, and D, the size of the indication information may be 4 bits, and each bit corresponds to one DCI format. In a case that the indication information of the DCI is "1000", it may indicate that the DCI is in the format A; in a case that the indication information of the DCI is "0100", it may indicate that the DCI is in the format B; in a case that the indication information of the DCI is "0010", it may indicate that the DCI is in the format C; and in a case that the indication information of the DCI is "0001", it may indicate that the DCI is in the format D. Alternatively, the size of the indication information may be 2 bits, and a value of 2-bit information corresponds to one DCI format. In a case that the indication information of the DCI is "00", it may indicate that the DCI is in the format A; in a case that the indication information of the DCI is "01", it may indicate that the DCI is in the format B; in a case that the indication information of the DCI is "10", it may indicate that the DCI is in the format C; and in a case that the indication information of the DCI is "11", it may indicate that the DCI is in the format D. The above formats A, B, C, and D may also be one pair or one group of specific DCI formats.

In this embodiment, optionally, a second size of the control signaling is the same as a second size of another piece of control signaling including the indication information.

In this way, second sizes of a plurality of pieces of control signaling including the indication information are the same. If the control signaling introduces the first information domain, for a plurality of pieces of control signaling introducing the first information domain, second sizes of the control signaling including the first information domain are the same. If the second sizes of the control signaling including the first information domain are different, the control signaling may be filled and aligned to a same size Optionally, the indication information and information about a preset domain are jointly encoded.

By using an example in which the preset domain is the domain of Identifiers for DCI formats, each code point simultaneously indicates that the DCI format is uplink or downlink scheduling, and is DCI x_1 or x_2, x_3 . . . . Certainly, the preset domain may also be another domain other than this, which is listed herein again.

Therefore, with reference to the method in this embodiment of this application, by using an example in which T is associated with DCI 1_1 and DCI 1_3, in DCI design 1, different DCI formats define different values of T:

DCI 1_1: in a 1-bit domain of Identifiers for DCI formats, values of bits are always set to 1 for representing a downlink DL DCI format. T is located after the domain of Identifiers for DCI formats. The size of T is 0 or 1 bit, and is determined by a high-level parameter. If values of T are always set to 0, it represents that the DCI format is 1_1. In this case, the domain T may be further used for DCI format verification. For example, in a case that the UE blindly detects the DCI 1_1, but the values corresponding to the domain T are different from a predefined or configured value (for example, the values of T are always set to 1, but detected values are 0), it means that the blind detection is a false alarm (false alarm). Certainly, other domains are set in the format. Details are not described herein again.

DCI 1_3: in a 1-bit domain of Identifiers for DCI formats, values of bits are always set to 1 for representing a downlink DL DCI format. T is located after the domain of Identifiers for DCI formats. The size of T is 0 or 1 bit, and is determined by a high-level parameter. If values of T are always set to 0, it represents that the DCI format is 1_3. Certainly, other domains are set in the format. Details are not described herein again.

In DCI design 2, the network-side device configures the size of T and values of T corresponding to different DCI formats.

DCI 1_1: in a 1-bit domain of Identifiers for DCI formats, values of bits are always set to 1 for representing a downlink DL DCI format. T is located after the domain of Identifiers for DCI formats. The size of T is 0, 1, or 2 bits, and is determined by a high-level parameter. The values of T are configured by the high-level parameter. Certainly, other domains are set in the format. Details are not described herein again.

DCI 1_3: in a 1-bit domain of Identifiers for DCI formats, values of bits are always set to 1 for representing a downlink DL DCI format. T is located after the domain of Identifiers for DCI formats. The size of T is 0, 1, or 2 bits, and is determined by a high-level parameter. The values of T are configured by the high-level parameter. Certainly, other domains are set in the format. Details are not described herein again.

Scenario 1. The network-side device configures that sizes of the DCI 1_1 and the DCI 1_3 are equal on all BWPs, so that a DCI budget of the UE can be shared and the complexity of blind detection can be reduced. To distinguish the DCI 1_1 and the DCI 1_3, the network-side device configures the domain T in the DCI, and the size of T is 1 bit, so that the UE can distinguish the DCI 1_1 and the DCI 1_3 according to the domain T.

Scenario 2. The network-side device configures that sizes of the DCI 1_1 and the DCI 1_3 are equal, so that a DCI budget of the UE can be shared and the complexity of blind detection can be reduced. The network-side device respectively configures different search spaces or different CORESETs for the DCI 1_1 and the DCI 1_3. The UE blindly detects DCI formats associated with the search spaces or the CORESETs in the search spaces or the CORESETs, so that the UE can distinguish the DCI 1_1 and the DCI 1_3 according to the domain T.

Scenario 3. The network-side device configures that sizes of the DCI 1_1 and the DCI 1_3 are equal, so that a DCI budget of the UE can be shared and the complexity of blind detection can be reduced. The network-side device configures, through the RRC, the domain T used for distinguishing the DCI 1_1 and the DCI 1_3 in the DCI. The network-side device indicates, through the MAC CE, whether the domain T actually exists in DCI of a cell, or a BWP, or a CORESET, or a search space (that is, the MAC CE activates the domain T as 0 bits or 1 bit). The UE blindly detects, according to the indication of the MAC CE, a physical downlink control channel PDCCH according to different DCI sizes. If the MAC CE indicates that the domain T exists, the UE distinguishes the DCI 1_1 and the DCI 1_3 according to the domain T. If the MAC CE indicates that the domain T does not exist, the UE blindly detects the PDCCH according to a predefined format (which may be the DCI 1_1 or the DCI 1_3). In this scenario, the network-side device may dynamically open the domain T according to actual needs.

Scenario 4. The network-side device configures the DCI 1_1 and the DCI 1_3 whose sizes are different, and configures the domain T used for distinguishing the DCI 1_1 and the DCI 1_3. If a quantity of pieces of DCI with different sizes currently monitored by the UE is less than the DCI budget (such as, 4), blind detection is performed according to each DCI size, and the domain T does not exist in the DCI. If the quantity of pieces of DCI with different sizes currently monitored by the UE exceeds the DCI budget, sizes of the DCI 1_1 and the DCI 1_3 are aligned, and the domain T exists in the DCI, and is used for distinguishing the DCI formats.

In addition, in this embodiment, in addition to that the control signaling uses a dedicated format domain indicating the control signaling, optionally, the indication information is information in a second information domain of the control signaling, where the second information domain is reused for indicating the format of the control signaling.

Herein, in addition to indicating the format of the control signaling, the second information domain may be further used for carrying one or more pieces of other information. In the second information domain, part or all of bits (or code points) are used for indicating the format of the control signaling. Alternatively, the network-side device configures which bits (or code points) used for indicating the format of the control signaling, and the format of the control signaling corresponding to each bit (or code point) in the second information domain.

Scenario 5. The network-side device configures that a cell 1 and a cell 2 are scheduled across carriers (so that a Carrier indicator exists in the DCI 1_1), and configures the DCI 1_3 on the cell 1 so that the cell 1 and a cell 3 can be jointly scheduled. Sizes of the DCI 1_1 and the DCI 1_3 are equal, so that a DCI budget of the UE can be shared and the complexity of blind detection can be reduced. A Carrier indicator domain (CIF) in the DCI 1_1 has 3 bits, and the cell 2 is scheduled across carriers (in this case, a CIF corresponding to the cell 1 is 0, and a CIF corresponding to the cell 2 is 1). Therefore, high two bits of the CIF are fixed to 00. Therefore, high one or two bits of the CIF may be used for indicating the DCI 1_1 and 1_3, that is, if a highest bit of the CIF is 0, it represents the DCI format 1_1; otherwise, it represents the DCI format 1_3. In this case, a CIF in the DCI 1_3 may have 2 or 3 bits, and a highest bit thereof is 1. Certainly, in addition to the Carrier indicator, a Bandwidth part indicator domain, the domain of Identifiers for DCI formats, and the like may also be used.

For example, in a case that the sizes of the DCI 1_1 and the DCI 0_1 in a system are different but the sizes of the DCI 1_1 and the DCI 1_3 are the same, or the cell is configured with downlink transmission, the UE does not need to monitor uplink scheduling (that is, does not need to monitor the DCI 0_1), and the UE does not need to distinguish uplink and downlink DCI formats (namely, the DCI 1_1 and the DCI 0_1) through the domain of Identifiers for DCI formats. Therefore, the domain of Identifiers for DCI formats may be reused for distinguishing the two downlink DCI formats DCI 1_1 and 1_3.

In conclusion, a user-side device can directly know, by obtaining indication information of control signaling, a format of the control signaling from the indication information, so that a limit of a size of control signaling blindly detected by the user-side device can be maintained while a plurality of formats of control signaling are flexibly supported, thereby reducing the implementation complexity of the user-side device, and saving power consumption and costs of the user device.

Figure 2:
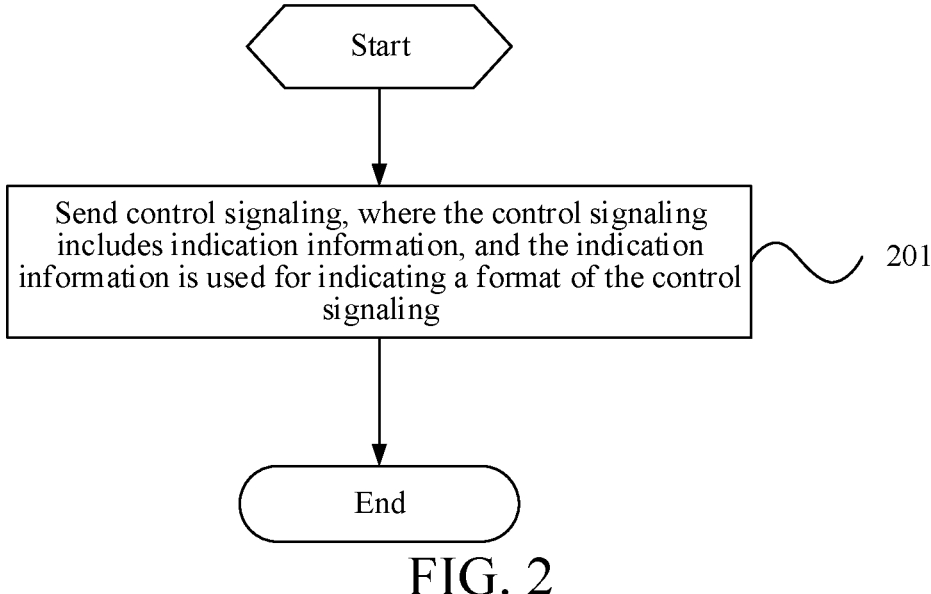
FIG. 2 is a schematic flowchart of a method for indicating a format of control signaling according to an embodiment of this application.

As shown in FIG. 2, an embodiment of this application provides a method for indicating a format of control signaling, including:

Step 201. Send control signaling, where the control signaling includes indication information, and the indication information is used for indicating a format of the control signaling.

According to this step, control signaling is sent, so that a user-side device can directly know, by obtaining indication information of the control signaling, a format of the control signaling from the indication information, so that a limit of a size of control signaling blindly detected by the user-side device can be maintained while a plurality of formats of control signaling are flexibly supported, thereby reducing the implementation complexity of the user-side device, and saving power consumption and costs of the user device.

The control signaling may be DCI, or may be RRC (Radio Resource Control, radio resource control signaling), or may be MAC CE (Media Access Control Control Element, media access control control element signaling), or the like. The DCI is used as an example for specific description in the following embodiments.

For example, a UE can know, by obtaining indication information of the DCI, a specific format of the DCI from the indication information, such as DCI 1-1, rather than be limited to knowing that the DCI is used for uplink scheduling or downlink scheduling. Moreover, the indication information can distinguish different common DCI, and can also distinguish the common DCI and UE-specific DCI.

In this embodiment, optionally, the indication information is information in a first information domain of the control signaling, where the first information domain is dedicatedly used for indicating the format of the control signaling.

In this way, for the indication information used for indicating the format of the control signaling, a dedicated domain, namely, the first information domain, may be introduced in the control signaling. Certainly, the first information domain always exists when the UE monitors all bandwidth parts BWP, all search spaces, and all monitoring occasions of the control signaling.

For example, a first information domain T is introduced in the DCI, and is used for indicating a specific format of the DCI. Alternatively, the domain T may indicate one format of the DCI used for downlink scheduling, that is, the UE knows through the domain T that the DCI is DCI 1_0, DCI 1_2, or DCI 1_x.

Optionally, the first information domain is located at a preset location in the control signaling, and the preset location is:

a start location; or an end location; or a location before or after a target domain.

In this way, the first information domain may be located at the start location in the control signaling, that is, the first information domain is a first domain of the control signaling. Alternatively, the first information domain may be located at the end location in the control signaling, that is, the first information domain is a last domain of the control signaling, but the domain is located before a CRC. Alternatively, the first information domain may be located at the location before or after the target domain in the control signaling. For example, for the DCI, if the target domain is a 1-bit domain of identifiers for DCI formats Identifier for DCI formats used for distinguishing uplink and downlink formats, the location of T may be a location after the domain of Identifiers for DCI formats. If the target domain is a carrier indicator Carrier indicator domain, an uplink or supplementary uplink indicator UL/SUL indicator domain, a bandwidth part indicator Bandwidth part indicator domain, a deep flow inspection flag DFI flag domain, a frequency domain resource assignment Frequency domain resource assignment domain, or the like, the location of T may be a location before the target domain.

In this embodiment, according to one aspect, optionally, before step 201, the method further includes:

sending configuration information, where the configuration information is used for indicating whether the indication information exists in the control signaling.

In this way, the UE can know, according to the received configuration information, whether the indication information exists in the control signaling, thereby obtaining the indication information. Certainly, the configuration information may also include information indicating a specific location of the indication information in the control signaling, a size of the indication information, content of the indication information, the format corresponding to the control signaling having the indication information, or the like.

The configuration information may be carried by the RRC, the MAC CE, or the DCI (such as group common (group common) DCI) sent by a network-side device.

According to another aspect, optionally, in a case that a preset condition is met, the control signaling carries the indication information.

Herein, for the preset condition, the control signaling carries the indication information in a case that the preset condition is met. Alternatively, for an implementation of carrying the indication information through the first information domain, whether the first information domain exists is determined according to whether the preset condition is met. For example, in a case that the preset condition is met, the DCI may introduce T to carry the indication information. However, in addition to that the first information domain is not introduced (for example, a size of the first information domain is 0 bits), that the control signaling does not carry the indication information may also be represented as that a value of the first information domain is set to a preset value (such as, 0).

In this embodiment, optionally, the preset condition includes at least one of the following:

control signaling corresponds to a preset bandwidth part BWP;

control signaling corresponds to a preset search space;

control signaling corresponds to a preset control resource set;

control signaling corresponds to a preset monitoring occasion;

control signaling is in a first preset format;

control signaling supports a preset function;

in monitored control signaling, a quantity of pieces of control signaling with different first sizes is greater than a preset value;

in a plurality of pieces of monitored control signaling, there are at least two pieces of control signaling with a same first size;

in a plurality of pieces of monitored control signaling, there are at least two pieces of control signaling with a same scrambling code;

in a plurality of pieces of monitored control signaling, there are at least two pieces of control signaling that use a same radio network temporary identifier RNTI to scramble a cyclic redundancy check CRC; or in a plurality of pieces of monitored control signaling, there are at least two pieces of control signaling whose control channel elements CCE overlap.

In this way, in a case that at least one of the above content is met, the control signaling carries the indication information indicating the format of the control signaling. The first preset format may be a specific format, and certainly, may also be one group of or a plurality of formats of a specific type. For example, a first preset format corresponding to the DCI may be only DCI 1_0, and may also be DCI formats used for downlink scheduling: the DCI 1_0, DCI 1_1, and DCI 1_2. The first size is a size of the control signaling determined based on a function or payload (payload) of the control signaling, and the control signaling with the first size is not considered whether to include the indication information indicating the format of the control signaling. The preset value may be a quantity of pieces of DCI with different sizes that is pre-defined by a system, configured by a network, or supported by the UE. For example, a preset value corresponding to the DCI may be a DCI size budget size budget of the UE, and the DCI size budget is a quantity of pieces of DCI with different sizes that are at most monitored by the UE for each cell.

For example, if a first size of a monitored DCI format A is the same as a first size of a DCI format B, but monitoring occasions or CCEs do not overlap, the indication information is not carried.

Certainly, if the network-side device configures the control signaling to have the first information domain and meet the above preset condition, the first information domain includes the indication information. For example, if the network-side device configures the DCI to have T and meet the above preset condition, T includes the indication information indicating the DCI format.

Optionally, the control signaling is one or more pieces of control signaling meeting the preset condition.

In this way, in a case that the preset condition is met, the one or more pieces of control signaling carry the indication information. In a case that the preset condition is met, which pieces of control signaling that may carry the indication information may be determined by formats of the control signaling. For example, the preset condition is that there is at least two pieces of DCI with a same first size in a plurality of monitored pieces of DCI. In a case that the preset condition is met, the at least two pieces of DCI may all carry the indication information, or may partially carry the indication information. Alternatively, part of pieces of DCI carrying the indication information may be non-basic scheduling non-fallback DCI. It should be known that, basic scheduling fallback DCI includes DCI 1_0 and 0_0, which may be monitored in a CSS. The non-fallback DCI refers to other UE-specific DCI formats other than the fallback DCI.

In addition, in this embodiment, optionally, the control signaling is control signaling in a second preset format.

In this way, the UE only can obtain the indication information of the control signaling in the second preset format. The second preset format may be a specific format, and certainly, may also be one group or a plurality of formats of a specific type. For example, a second preset format corresponding to the DCI may be only DCI 0_1, and may also be a non-fallback uplink scheduling format, namely, the DCI 0_1 and DCI 0_2.

Certainly, if the indication information is information in the first information domain of the control signaling, and corresponds to the second preset format, the first information domain is associated with the second preset format, that is, control signaling in a non-second preset format does not include the first information domain. For example, for the DCI, if the second preset format is the DCI 0_1, T is associated with the DCI 0_1, that is, the DCI 0_2 does not include T, so that the UE may distinguish different DCI formats according to DCI sizes.

In this embodiment, optionally, a size of the indication information is configured by a network-side device; or
    corresponds to a quantity of formats of the control signaling monitored by a user-side device; or
    corresponds to a quantity of formats of the control signaling including the indication information.

The network-side device may configure the size of the indication information through the configuration information, such as 0, 1, or 2 bits. If the size of the indication information corresponds to the quantity of formats of the control signaling monitored by the user-side device, the size of the indication information may be equal to the quantity of formats of the control signaling monitored by the user-side device, or may be calculated by using a preset related function based on the quantity of formats of the control signaling monitored by the user-side device. For example, the size of the indication information is S bits, $S=\lceil \log_2 N \rceil$, and N is the quantity of formats of the monitored control signaling. Similarly, if the size of the indication information corresponds to the quantity of formats of the control signaling including the indication information, the size of the indication information may be equal to the quantity of formats of the control signaling including the indication information, or may be calculated by using a preset related function based on the quantity of formats of the control signaling including the indication information. For example, the size of the indication information is S bits, $S=\lceil \log_2 M \rceil$, and M is the quantity of formats of the control signaling including the indication information.

By using the DCI as an example, if the second preset format is an uplink scheduling format, namely, DCI 0_0 and DCI 0_1, a quantity of formats of DCI including the indication information is 2, and the size of the indication information is 1 bit.

Certainly, if the indication information is the information in the first information domain of the control signaling, the size of the indication information is the size of the first information domain.

In this embodiment, optionally, the content of the indication information is predefined, or configured by the network-side device.

For the predefined content of the indication information, the UE obtains the indication information, and can directly know the format of the control signaling indicated by the indication information. For the content of the indication information configured by the network-side device, the UE needs to first know configuration for the content of the indication information through the configuration information of the network-side device, and then can know the format of the control signaling indicated by the indication information after obtaining the indication information.

In addition, in this embodiment, optionally, each code point corresponds to the format of the control signaling in the indication information; or
    a value of the indication information corresponds to the format of the control signaling.

In this way, by predefinition or configuration of the network-side device, one implementation is that each code point in the indication information corresponds to the format of the control signaling; and the other implementation is that the value of the indication information corresponds to the format of the control signaling.

For example, for the DCI, assuming that there are four DCI formats A, B, C, and D, the size of the indication information may be 4 bits, and each bit corresponds to one DCI format. In a case that the indication information of the DCI is "1000", it may indicate that the DCI is in the format A; in a case that the indication information of the DCI is "0100", it may indicate that the DCI is in the format B; in a case that the indication information of the DCI is "0010", it may indicate that the DCI is in the format C; and in a case that the indication information of the DCI is "0001", it may indicate that the DCI is in the format D. Alternatively, the size of the indication information may be 2 bits, and a value of 2-bit information corresponds to one DCI format. In a case that the indication information of the DCI is "00", it may indicate that the DCI is in the format A; in a case that the indication information of the DCI is "01", it may indicate that the DCI is in the format B; in a case that the indication information of the DCI is "10", it may indicate that the DCI is in the format C; and in a case that the indication information of the DCI is "11", it may indicate that the DCI is in the format D. The above formats A, B, C, and D may also be one pair or one group of specific DCI formats.

In this embodiment, optionally, a second size of the control signaling is the same as a second size of another piece of control signaling including the indication information.

In this way, second sizes of a plurality of pieces of control signaling including the indication information are the same. If the control signaling introduces the first information domain, for a plurality of pieces of control signaling introducing the first information domain, second sizes of the control signaling including the first information domain are the same. If the second sizes of the control signaling including the first information domain are different, the control signaling may be filled and aligned to a same size Optionally, the indication information and information about a preset domain are jointly encoded.

By using an example in which the preset domain is the domain of Identifiers for DCI formats, each code point simultaneously indicates that the DCI format is uplink or downlink scheduling, and is DCI x_1 or x_2, x_3 . . . . Certainly, the preset domain may also be another domain other than this, which is listed herein again.

In addition, in this embodiment, in addition to that the control signaling uses a dedicated format domain indicating the control signaling, optionally, the indication information is information in a second information domain of the control signaling, where the second information domain is reused for indicating the format of the control signaling.

Herein, in addition to indicating the format of the control signaling, the second information domain may be further used for carrying one or more pieces of other information. In the second information domain, part or all of bits (or code points) are used for indicating the format of the control signaling. Alternatively, the network-side device configures which bits (or code points) used for indicating the format of the control signaling, and the format of the control signaling corresponding to each bit (or code point) in the second information domain.

In conclusion, a network-side device sends control signaling, so that a user-side device can directly know, by obtaining indication information of the control signaling, a format of the control signaling from the indication information, so that a limit of a size of control signaling blindly detected by the user-side device can be maintained while a plurality of formats of control signaling are flexibly supported, thereby reducing the implementation complexity of the user-side device, and saving power consumption and costs of the user device.

It should be noted that, in the method for determining a format of control signaling provided in the embodiments of this application, an execution entity may be an apparatus for determining a format of control signaling, or a control module configured to execute and load the method for determining a format of control signaling in the apparatus for determining a format of control signaling. In this embodiment of this application, an example in which the apparatus for determining a format of control signaling executes and loads the method for determining a format of control signaling is used to describe the method for determining a format of control signaling provided in the embodiments of this application.

Figures 3, 4:
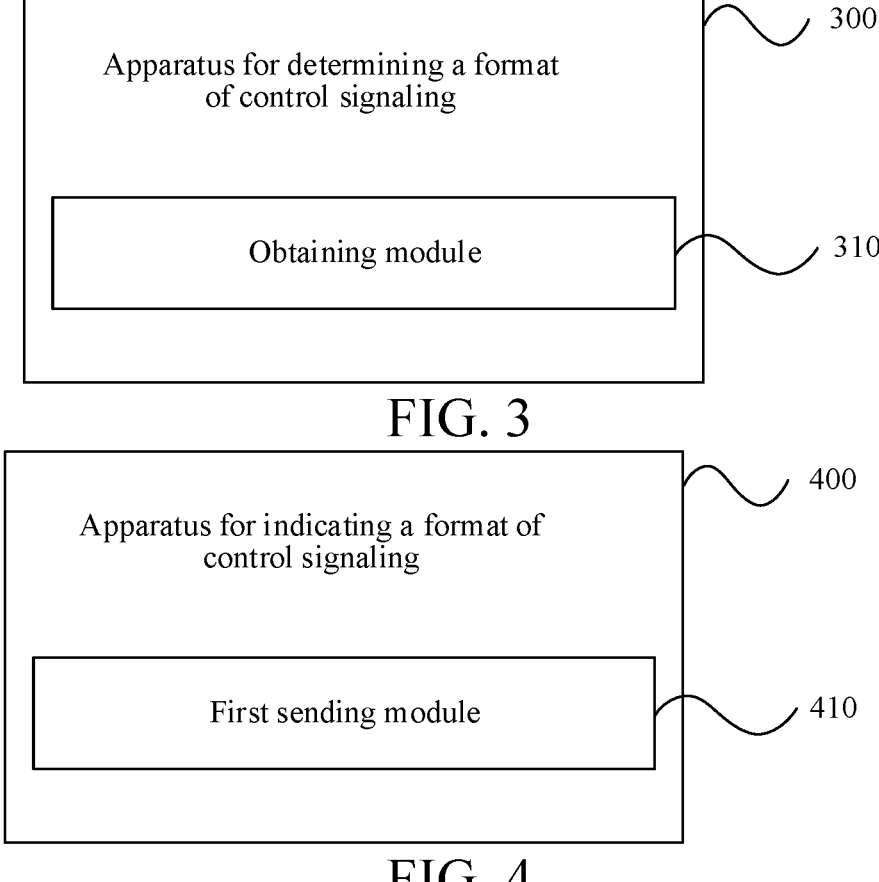
FIG. 3 is a schematic structural diagram of an apparatus for determining a format of control signaling according to an embodiment of this application.
FIG. 4 is a schematic structural diagram of an apparatus for indicating a format of control signaling according to an embodiment of this application.

FIG. 3 is a block diagram of an apparatus for determining a format of control signaling according to an embodiment of this application. An apparatus 300 for determining a format of control signaling shown in FIG. 3 includes an obtaining module 310.

The obtaining module 310 is configured to obtain indication information of control signaling, where the indication information is used for indicating a format of the control signaling.

Optionally, the indication information is information in a first information domain of the control signaling, where the first information domain is dedicatedly used for indicating the format of the control signaling.

Optionally, the apparatus further includes:

a receiving module, configured to receive configuration information sent by a network-side device, where the configuration information is used for indicating whether the indication information exists in the control signaling.

Optionally, in a case that a preset condition is met, the control signaling carries the indication information.

Optionally, the preset condition includes at least one of the following:

control signaling corresponds to a preset bandwidth part BWP;

control signaling corresponds to a preset search space;

control signaling corresponds to a preset control resource set;

control signaling corresponds to a preset monitoring occasion;

control signaling is in a first preset format;

control signaling supports a preset function;

in monitored control signaling, a quantity of pieces of control signaling with different first sizes is greater than a preset value;

in a plurality of pieces of monitored control signaling, there are at least two pieces of control signaling with a same first size;

in a plurality of pieces of monitored control signaling, there are at least two pieces of control signaling with a same scrambling code;

in a plurality of pieces of monitored control signaling, there are at least two pieces of control signaling that use a same radio network temporary identifier RNTI to scramble a cyclic redundancy check CRC; or in a plurality of pieces of monitored control signaling, there are at least two pieces of control signaling whose control channel elements CCE overlap.

Optionally, the control signaling is one or more pieces of control signaling meeting the preset condition.

Optionally, the control signaling is control signaling in a second preset format.

Optionally, a size of the indication information is configured by a network-side device; or corresponds to a quantity of formats of the control signaling monitored by a user-side device; or corresponds to a quantity of formats of the control signaling including the indication information.

Optionally, the content of the indication information is predefined, or configured by the network-side device.

Optionally, each code point corresponds to the format of the control signaling in the indication information; or a value of the indication information corresponds to the format of the control signaling.

Optionally, the indication information and information about a preset domain are jointly encoded.

Optionally, the first information domain is located at a preset location in the control signaling, and the preset location is:

a start location; or an end location; or a location before or after a target domain.

Optionally, a second size of the control signaling is the same as a second size of another piece of control signaling including the indication information.

Optionally, the indication information is information in a second information domain of the control signaling, where the second information domain is reused for indicating the format of the control signaling.

The apparatus for determining a format of control signaling in this embodiment of this application may be an apparatus, or may be a component, an integrated circuit, or a chip in the user-side device. The apparatus may be a mobile electronic device or a non-mobile electronic device. Exemplarily, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like, and the non-mobile electronic device may be a server, a network attached storage (NAS), a personal computer (PC), a television (television, TV), a teller machine, a self-service machine, or the like. This is not specifically limited in this embodiment of this application.

The apparatus for determining a format of control signaling in this embodiment of this application may be an apparatus having an operating system. The operating system may be an android (Android) operating system, may be an ios operating system, and may also be another possible operating system. This is not specifically limited in this embodiment of this application.

The apparatus for determining a format of control signaling provided in this embodiment of this application can implement all processes implemented by the user-side device in the method embodiment of FIG. 1. To avoid repetition, details are not described herein again.

An apparatus in this embodiment of this application can directly know, by obtaining indication information of control signaling, a format of the control signaling from the indication information, so that a limit of a size of control signaling blindly detected by a user-side device can be maintained while a plurality of formats of control signaling are flexibly supported, thereby reducing the implementation complexity of the user-side device, and saving power consumption and costs of the user device.

It should be noted that, in the method for indicating a format of control signaling provided in the embodiments of this application, an execution entity may be an apparatus for indicating a format of control signaling, or a control module configured to execute and load the method for indicating a format of control signaling in the apparatus for indicating a format of control signaling. In this embodiment of this application, an example in which the apparatus for indicating a format of control signaling executes and loads the method for indicating a format of control signaling is used to describe the method for indicating a format of control signaling provided in the embodiments of this application.

FIG. 4 is a block diagram of an apparatus for indicating a format of control signaling according to an embodiment of this application. An apparatus 400 for indicating a format of control signaling shown in FIG. 4 includes a first sending module 410.

The first sending module 410 is configured to send a control signaling, where the control signaling includes indication information, and the indication information is used for indicating a format of the control signaling.

Optionally, the indication information is information in a first information domain of the control signaling, where the first information domain is dedicatedly used for indicating the format of the control signaling.

Optionally, the apparatus further includes:

a second sending module, configured to send configuration information, where the configuration information is used for indicating whether the indication information exists in the control signaling.

Optionally, in a case that a preset condition is met, the control signaling carries the indication information.

Optionally, the preset condition includes at least one of the following:

control signaling corresponds to a preset bandwidth part BWP;

control signaling corresponds to a preset search space;

control signaling corresponds to a preset control resource set;

control signaling corresponds to a preset monitoring occasion;

control signaling is in a first preset format;

control signaling supports a preset function;

in monitored control signaling, a quantity of pieces of control signaling with different first sizes is greater than a preset value;

in a plurality of pieces of monitored control signaling, there are at least two pieces of control signaling with a same first size;

in a plurality of pieces of monitored control signaling, there are at least two pieces of control signaling with a same scrambling code;

in a plurality of pieces of monitored control signaling, there are at least two pieces of control signaling that use a same radio network temporary identifier RNTI to scramble a cyclic redundancy check CRC; or in a plurality of pieces of monitored control signaling, there are at least two pieces of control signaling whose control channel elements CCE overlap.

Optionally, the control signaling is one or more pieces of control signaling meeting the preset condition.

Optionally, the control signaling is control signaling in a second preset format.

Optionally, a size of the indication information is configured by a network-side device; or corresponds to a quantity of formats of the control signaling monitored by a user-side device; or corresponds to a quantity of formats of the control signaling including the indication information.

Optionally, the content of the indication information is predefined, or configured by the network-side device.

Optionally, each code point corresponds to the format of the control signaling in the indication information; or a value of the indication information corresponds to the format of the control signaling.

Optionally, the indication information and information about a preset domain are jointly encoded.

Optionally, the first information domain is located at a preset location in the control signaling, and the preset location is:

a start location; or an end location; or a location before or after a target domain.

Optionally, a second size of the control signaling is the same as a second size of another piece of control signaling including the indication information.

Optionally, the indication information is information in a second information domain of the control signaling, where the second information domain is reused for indicating the format of the control signaling.

The apparatus for indicating a format of control signaling provided in this embodiment of this application can implement all processes implemented by the network-side device in the method embodiment of FIG. 2. To avoid repetition, details are not described herein again.

An apparatus in this embodiment of this application sends control signaling, so that a user-side device can directly know, by obtaining indication information of the control signaling, a format of the control signaling from the indication information, so that a limit of a size of control signaling blindly detected by the user-side device can be maintained while a plurality of formats of control signaling are flexibly supported, thereby reducing the implementation complexity of the user-side device, and saving power consumption and costs of the user device.

Optionally, an embodiment of this application further provides an electronic device, including a processor, a memory and, and a program or instruction stored in the memory and executable on the processor. The program or instruction, when executed by the processor, implements all processes of the embodiments of the steps of the method for determining a format of control signaling described above, or implements all processes of the embodiments of the steps of the method for indicating a format of control signaling described above, and can achieve the same technical effects. To avoid repetition, details are not described herein again.

It should be noted that, the electronic device in this embodiment of this application includes the above user-side device and network-side device.

Figure 5:
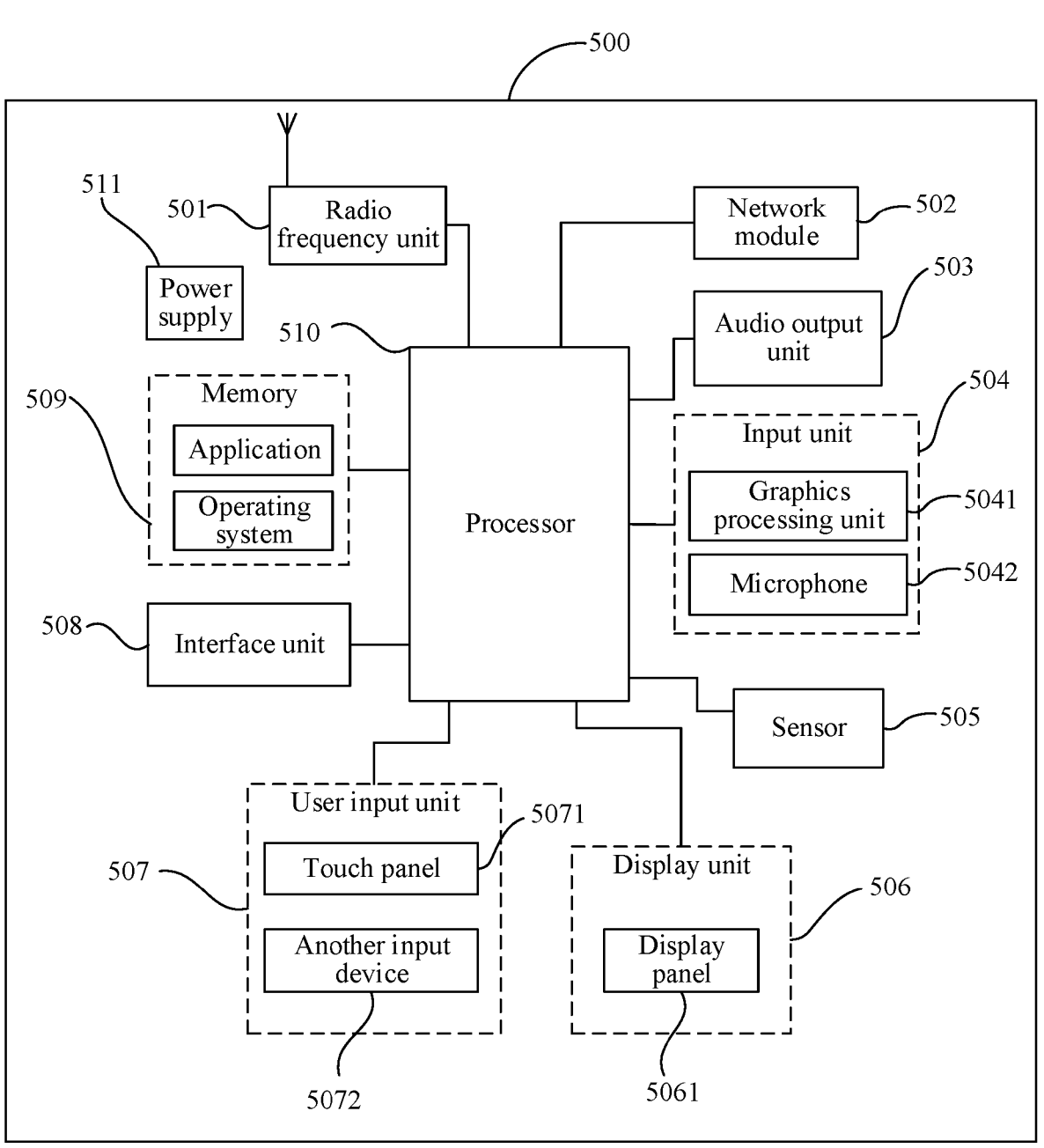
FIG. 5 is a schematic structural diagram of a user-side device according to an embodiment of this application.

FIG. 5 is a schematic diagram of a hardware structure of a user-side device that implements the embodiments of this application.

A user-side device 500 includes, but is not limited to, components such as a radio frequency unit 501, a network module 502, an audio output unit 503, an input unit 504, a sensor 505, a display unit 506, a user input unit 507, an interface unit 508, a memory 509, a processor 510, and a power supply 511.

A person skilled in the art may understand that the structure of the user-side device shown in FIG. 5 constitutes no limitation on the user-side device, and the user-side device may include more or fewer components than those shown in the figure, or some components may be combined, or a different component deployment may be used. In the embodiments of this application, the user-side device includes, but is not limited to, a mobile phone, a tablet computer, a notebook computer, a palmtop computer, an in-vehicle terminal, a wearable device, a pedometer, and the like.

The processor 510 is configured to obtain indication information of control signaling, where the indication information is used for indicating a format of the control signaling.

It can be seen that, a user-side device can directly know, by obtaining indication information of control signaling, a format of the control signaling from the indication information, so that a limit of a size of control signaling blindly detected by the user-side device can be maintained while a plurality of formats of control signaling are flexibly supported, thereby reducing the implementation complexity of the user-side device, and saving power consumption and costs of the user device.

Optionally, the indication information is information in a first information domain of the control signaling, where the first information domain is dedicatedly used for indicating the format of the control signaling.

Optionally, the radio frequency unit 501 is configured to receive configuration information sent by a network-side device, where the configuration information is used for indicating whether the indication information exists in the control signaling.

Optionally, in a case that a preset condition is met, the control signaling carries the indication information.

Optionally, the preset condition includes at least one of the following:

control signaling corresponds to a preset bandwidth part BWP;

control signaling corresponds to a preset search space;

control signaling corresponds to a preset control resource set;

control signaling corresponds to a preset monitoring occasion;

control signaling is in a first preset format;

control signaling supports a preset function;

in monitored control signaling, a quantity of pieces of control signaling with different first sizes is greater than a preset value;

in a plurality of pieces of monitored control signaling, there are at least two pieces of control signaling with a same first size;

in a plurality of pieces of monitored control signaling, there are at least two pieces of control signaling with a same scrambling code;

in a plurality of pieces of monitored control signaling, there are at least two pieces of control signaling that use a same radio network temporary identifier RNTI to scramble a cyclic redundancy check CRC; or in a plurality of pieces of monitored control signaling, there are at least two pieces of control signaling whose control channel elements CCE overlap.

Optionally, the control signaling is one or more pieces of control signaling meeting the preset condition.

Optionally, the control signaling is control signaling in a second preset format.

Optionally, a size of the indication information is configured by a network-side device; or corresponds to a quantity of formats of the control signaling monitored by a user-side device; or corresponds to a quantity of formats of the control signaling including the indication information.

Optionally, the content of the indication information is predefined, or configured by the network-side device.

Optionally, each code point corresponds to the format of the control signaling in the indication information; or a value of the indication information corresponds to the format of the control signaling.

Optionally, the indication information and information about a preset domain are jointly encoded.

Optionally, the first information domain is located at a preset location in the control signaling, and the preset location is:

a start location; or an end location; or a location before or after a target domain.

Optionally, a second size of the control signaling is the same as a second size of another piece of control signaling including the indication information.

Optionally, the indication information is information in a second information domain of the control signaling, where the second information domain is reused for indicating the format of the control signaling.

It should be understood that, in the embodiments of this application, the radio frequency unit 501 may be configured to transmit and receive information or transmit and receive signals during a call. Alternatively, the radio frequency unit is configured to receive downlink data from a base station and transmit downlink data to the processor 510 for processing. In addition, the radio frequency unit transmits uplink data to the base station. Generally, the radio frequency unit 501 includes, but is not limited to, an antenna, at least one amplifier, a transceiver, a coupler, a low noise amplifier, a duplexer, and the like. In addition, the radio frequency unit 501 may further communicate with another device through a wireless communication system and a network.

The user-side device provides wireless broadband Internet access for a user by using the network module 502, for example, allowing the user to send and receive emails, browse webpages, access streaming media content, and the like.

The audio output unit 503 may convert audio data received by the radio frequency unit 501 or the network module 502 or stored in the memory 509 into audio signals and output the audio signals as sounds. In addition, the audio output unit 503 may further provide an audio output that is related to a particular function executed by the user-side device 500 (for example, a call signal receiving sound or a message receiving sound). The audio output unit 503 includes a speaker, a buzzer, a receiver, and the like The input unit 504 is configured to receive an audio or video signal. The input unit 504 may include a graphics processing unit (Graphics Processing Unit, GPU) 5041 and a microphone 5042. The graphics processing unit 5041 performs processing on image data of a static picture or a video that is obtained by an image acquisition apparatus (for example, a camera) in a video acquisition mode or an image acquisition mode. The processed image frame may be displayed on the display unit 506. An image frame that has been processed by the graphics processing unit 5041 may be stored in the memory 509 (or another storage medium) or sent by using the radio frequency unit 501 or the network module 502. The microphone 5042 may receive a sound and can process such a sound into audio data. The processed audio data may be converted, in a phone call mode, into a format that may be sent by the radio frequency unit 501 to a mobile communication base station.

The user-side device 500 further includes at least one sensor 505 such as an optical sensor, a motion sensor, or another sensor. Alternatively, the optical sensor includes an ambient light sensor and a proximity sensor. The ambient light sensor may adjust luminance of a display panel 5061 according to brightness of the ambient light. The proximity sensor may switch off the display panel 5061 and/or backlight when the user-side device 500 is moved to the ear. As a type of motion sensor, an acceleration sensor can detect magnitudes of accelerations in various directions (generally, on three axes), may detect a magnitude and a direction of the gravity in a static state, and may be applied to recognizing an altitude of the user-side device (for example, switching between a landscape state and a portrait state, a related game, and magnetometer attitude calibration), a function related to vibration recognition (such as a pedometer and a knock), and the like. The sensor 505 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 506 is configured to display information inputted by the user or information provided for the user. The display unit 506 may include a display panel 5061. The display panel 5061 may be configured by using a liquid crystal display (Liquid Crystal Display, LCD), an organic light-emitting diode (Organic Light-Emitting Diode, OLED), or the like.

The user input unit 507 may be configured to receive input digit or character information, and generate a keyboard signal input related to the user setting and function control of the user-side device. Alternatively, the user input unit 507 includes a touch panel 5071 and another input device 5072. The touch panel 5071, also referred to as a touchscreen, may collect a touch operation of a user on or near the touch panel (such as an operation of a user on or near the touch panel 5071 by using any suitable object or attachment, such as a finger or a touch pen). The touch panel 5071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 510. Moreover, the touch controller may receive and execute a command transmitted from the processor 510. In addition, the touch panel 5071 may be implemented by using various types, such as a resistive type, a capacitance type, an infrared type, and a surface acoustic wave type. In addition to the touch panel 5071, the user input unit 507 may further include the another input device 5072. Alternatively, the another input device 5072 may include, but is not limited to, a physical keyboard, a functional key (for example, a volume control key or a switch key), a track ball, a mouse, and a joystick, and the details will not be described herein again.

Further, the touch panel 5071 may cover the display panel 5061. After detecting a touch operation on or near the touch panel, the touch panel 5071 transfers the touch operation to the processor 510, to determine a type of a touch event. Then, the processor 510 provides a corresponding visual output on the display panel 5061 according to the type of the touch event. In FIG. 5, the touch panel 5071 and the display panel 5061 implement, as two independent parts, input and output functions of the user-side device. However, in some embodiments, the touch panel 5071 and the display panel 5061 may be integrated to implement the input and output functions of the user-side device. The details are not limited herein.

The interface unit 508 is an interface for connecting an external apparatus and the user-side device 500. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 508 may be configured to receive an input (for example, data information or power) from an external apparatus, and transmit the received input to one or more elements in the user-side device 500, or may be configured to transmit data between the user-side device 500 and the external apparatus.

The memory 509 may be configured to store a software program and various data. The memory 509 may mainly include a program storage region and a data storage region. The program storage region may store an operating system, an application program required by at least one function (for example, a sound playback function and an image playback function), or the like. The data storage region may store data (for example, audio data and a phone book) created according to use of the mobile phone. In addition, the memory 509 may include a high speed random access memory, and may also include a non-volatile memory, such as at least one magnetic disk storage device, a flash memory, or another volatile solid-state storage device.

The processor 510 is a control center of the user-side device, and connects to various parts of the user-side device by using various interfaces and lines. By running or executing the software program and/or module stored in the memory 509, and invoking data stored in the memory 509, the processor performs various functions and data processing of the user-side device, thereby performing overall monitoring on the user-side device. Optionally, the processor 510 may include one or more processing units. Preferably, the processor 510 may integrate an application processor and a modem. The application processor mainly processes an operating system, a user interface, an application program, and the like. The modem mainly processes wireless communication. It may be understood that the foregoing modem may not be integrated into the processor 510.

The user-side device 500 may further include the power supply 511 (for example, a battery) for supplying power to the components. Preferably, the power supply 511 may be logically connected to the processor 510 by a power management system, thereby implementing functions such as charging, discharging, and power consumption management by using the power management system.

In addition, the user-side device 500 includes some functional module that are not shown, which are not described herein in detail.

An embodiment of this application further provides a readable storage medium, storing a program or instruction. The program or instruction, when executed by a processor, implements all processes of the embodiments of the method for determining a format of control signaling described above, or implements all processes of the embodiments of the method for indicating a format of control signaling described above, and can achieve the same technical effects. To avoid repetition, details are not described herein again.

The processor is the processor in the above electronic device in the foregoing embodiments. The readable storage medium includes a computer-readable storage medium, for example, a read-only memory (ROM), a random access memory (RAM), a magnetic disk, or an optical disc.

An embodiment of this application further provides a chip, including: a processor and a communication interface, where the communication interface is coupled to the processor, and the processor is configured to run a program or instruction, to implement all processes of the embodiments of the method for determining a format of control signaling described above, or implement all processes of the embodiments of the method for indicating a format of control signaling described above, and can achieve the same technical effects. To avoid repetition, details are not described herein again.

It should be understood that, the chip mentioned in this embodiment of this application may also be referred to as a system-level chip, a system chip, a chip system, a system on chip, or the like.

It may be understood that the embodiments described in the present disclosure may be implemented by hardware, software, firmware, middleware, microcode, or a combination thereof. For hardware implementation, a module, a unit, a sub-module, and a sub-unit may be implemented in one or more application-specific integrated circuits (ASIC), a digital signal processor (DSP), a digital signal processing device (DSPD), a programmable logic device (PLD), a field-programmable gate array (FPGA), a general purpose processor, a controller, a micro-controller, a microprocessor, and other electronic units configured to execute the functions described in this application, or a combination of the above.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that the scope of the methods and apparatuses in the implementations of this application is not limited to performing the functions in the order shown or discussed, but may also include performing, according to involved functions, the functions basically simultaneously or in a reverse order. For example, the described methods may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions in this application essentially or the part contributing to the existing technologies may be implemented in the form of a software product. The computer software product is stored in a storage medium (for example, a read-only memory (ROM)/random access memory (RAM), a magnetic disk or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A method for determining a format of control signaling, comprising:

obtaining indication information of control signaling, wherein the indication information is used for indicating a format of the control signaling, wherein the control signaling dynamically carries the indication information, and in a case that a preset condition is met, the control signaling carries the indication information, and in a case that the preset condition is not met, the control signaling does not carry the indication information, and wherein the preset condition comprises at least one of the following:

in monitored control signaling, a quantity of pieces of control signaling with different first sizes is greater than a preset value;

in a plurality of pieces of monitored control signaling, there are at least two pieces of control signaling with a same scrambling code; or in a plurality of pieces of monitored control signaling, there are at least two pieces of control signaling whose control channel elements (CCE) overlap.

2. The method according to claim 1, wherein the indication information is information in a first information domain of the control signaling, wherein the first information domain is dedicatedly used for indicating the format of the control signaling.

3. The method according to claim 1, wherein before the obtaining indication information of control signaling, the method further comprises:

receiving configuration information sent by a network-side device, wherein the configuration information is used for indicating whether the indication information exists in the control signaling.

4. The method according to claim 1, wherein a size of the indication information is configured by a network-side device; or corresponds to a quantity of formats of the control signaling monitored by a user-side device; or corresponds to a quantity of formats of the control signaling comprising the indication information.

5. The method according to claim 1, wherein each code point corresponds to the format of the control signaling in the indication information; or a value of the indication information corresponds to the format of the control signaling.

6. The method according to claim 1, wherein the indication information and information about a preset domain are jointly encoded.

7. The method according to claim 2, wherein the first information domain is located at a preset location in the control signaling, and the preset location is:

a start location; or an end location; or a location before or after a target domain.

8. A method for indicating a format of control signaling, comprising:

sending control signaling, wherein the control signaling comprises indication information, and the indication information is used for indicating a format of the control signaling, wherein the control signaling dynamically carries the indication information, and in a case that a preset condition is met, the control signaling carries the indication information, and in a case that the preset condition is not met, the control signaling does not carry the indication information, and wherein the preset condition comprises at least one of the following:

in monitored control signaling, a quantity of pieces of control signaling with different first sizes is greater than a preset value;

in a plurality of pieces of monitored control signaling, there are at least two pieces of control signaling with a same scrambling code; or in a plurality of pieces of monitored control signaling, there are at least two pieces of control signaling whose control channel elements (CCE) overlap.

9. The method according to claim 8, wherein the indication information is information in a first information domain of the control signaling, wherein the first information domain is dedicatedly used for indicating the format of the control signaling.

10. The method according to claim 8, wherein before the sending control signaling, the method further comprises:

sending configuration information, wherein the configuration information is used for indicating whether the indication information exists in the control signaling.

11. The method according to claim 8, wherein a size of the indication information is configured by a network-side device; or corresponds to a quantity of formats of the control signaling monitored by a user-side device; or corresponds to a quantity of formats of the control signaling comprising the indication information.

12. The method according to claim 8, wherein each code point corresponds to the format of the control signaling in the indication information; or a value of the indication information corresponds to the format of the control signaling.

13. The method according to claim 8, wherein the indication information and information about a preset domain are jointly encoded.

14. The method according to claim 9, wherein the first information domain is located at a preset location in the control signaling, and the preset location is:

a start location; or an end location; or a location before or after a target domain.

15. An electronic device, comprising:

a processor and;

a memory storing a program or instruction that is executable on the processor, wherein the program or instruction, when executed by the processor, causes the electronic device to:

obtain indication information of control signaling, wherein the indication information is used for indicating a format of the control signaling, wherein the control signaling dynamically carries the indication information, and in a case that a preset condition is met, the control signaling carries the indication information, and in a case that the preset condition is not met, the control signaling does not carry the indication information, and wherein the preset condition comprises at least one of the following:

in monitored control signaling, a quantity of pieces of control signaling with different first sizes is greater than a preset value;

in a plurality of pieces of monitored control signaling, there are at least two pieces of control signaling with a same scrambling code; or in a plurality of pieces of monitored control signaling, there are at least two pieces of control signaling whose control channel elements (CCE) overlap.

16. The electronic device according to claim 15, wherein before obtaining indication information of control signaling, the program or instruction, when executed by the processor, further causes the electronic device to:

receive configuration information sent by a network-side device, wherein the configuration information is used for indicating whether the indication information exists in the control signaling.

17. An electronic device, comprising:

a processor and;

a memory storing a program or instruction that is executable on the processor, wherein the program or instruction, when executed by the processor, causes the electronic device to perform the method for indicating a format of control signaling according to claim 9.

18. The electronic device according to claim 17, wherein before sending control signaling, the program or instruction, when executed by the processor, further causes the electronic device to:

send configuration information, wherein the configuration information is used for indicating whether the indication information exists in the control signaling.

* * * * *